United States Patent [19]

Espejo

[11] 4,264,086
[45] Apr. 28, 1981

[54] BUMPER HITCH

[76] Inventor: Eusebio H. Espejo, 1429 Alma St., San Pedro, Calif. 90731

[21] Appl. No.: 972,042

[22] Filed: Dec. 21, 1978

[51] Int. Cl.² ............................................. B60D 1/14
[52] U.S. Cl. .............................. 280/502; 280/490 R
[58] Field of Search .................... 280/502, 500, 490 R

[56] References Cited

U.S. PATENT DOCUMENTS

| | | | |
|---|---|---|---|
| 2,432,249 | 12/1947 | Pearson | 280/502 |
| 2,531,107 | 11/1950 | Burkey | 280/502 |
| 2,847,232 | 8/1958 | Graham | 280/490 |
| 2,859,982 | 11/1958 | Covi | 280/502 |

*Primary Examiner*—John J. Love
*Assistant Examiner*—Donn McGiehan

*Attorney, Agent, or Firm*—Subkow and Kriegel

[57] ABSTRACT

A bumper hitch has a clamp applied to a vehicle bumper by a flexible strap and hooks. The flexible strap is initially wound on rotatable cross members to initially engage the hooks with the upper and lower, inner edges of the bumper. Screws at opposite ends of the cross members are tightened to move the cross members in vertical slots, one towards the other, to tension the straps, and causing tight engagement of the hooks with the edges of the bumper, to securely mount the clamp on the bumper. A plate on the clamp has a hole to receive a pin on the companion hitch part. The pin is vertically disposed at the end of a support arm which is inclined relative to a connector plate, enabling inversion of the pin and arm to effect a connection at different elevations.

20 Claims, 2 Drawing Figures

BUMPER HITCH

This invention relates to bumper hitches applicable to the bumper of an automotive vehicle enabling the connection of towed or vehicle supported structures to the bumper.

Bumper hitches of the type with which the present invention is concerned, in general, comprise a clamping structure applicable to the bumper, generally the rear bumper, of a motor vehicle and adapted to be interconnected with the companion connector part on the towed vehicle or other structure which is to be supported by the clamp applied to the bumper.

Usually the bumper hitch clamp is adapted to be easily installed and removed, since the hitch is not desired or necessary, at all times. Such installation and removal can be damaging to the chrome or other finish on the bumper. In addition, installation may be complicated by the need for special tools or equipment. The attachment of bumper hitch clamps to the vehicle bumpers must also be secure, and the clamp may be required to support substantial load, and at the same time, be capable of pulling a towed vehicle. In the case of the trailer, the bumper hitch must support the so-called "tongue" weight and must also be capable of pulling the trailer. On the other hand, in the case of structures supported on the vehicle the clamp must support the weight applied by the structure.

The bumper hitch, herein disclosed, is particularly well suited for use in supporting the camping unit on a pair of the hitches, applied to the rear bumper of the vehicle, as more particularly shown and described in my companion patent application, Ser. No. 971,871 filed concurrently herewith. However, the bumper hitch of the present invention has advantageous application in other uses, including the pulling of a trailer or supporting other structures on the rear bumper of the vehicle.

The present invention provides a bumper hitch which is of simple construction and which is applicable to the vehicle bumper in a simple manner.

The present bumper hitch utilizes as a means for interconnecting hooks which are applied to the upper and lower inner edges of the vehicle bumper with a body structure, a flexible, but strong woven strap or webbing which is easily tensioned to securely clamp the body to the bumper. Such straps are readily available and are widely used as cargo tie down straps and in hoisting apparatus, since they are lightweight, flexible, but quite strong, having tensile strength in excess of a number of thousands of pounds in a single run. Such straps are also known to be very wear and abrasion resistant.

In accordance with the invention, a length of flexible strap of the type referred to above is connected at its ends to a pair of cross members which extend between laterally spaced clamp walls, and the bumper engaging hooks are slideably carried by the intermediate length of this strap so as to be engageable with the upper and lower edges of bumpers of different dimensions, with the strap extending about the exterior of the bumper between the hooks. At least one of the members to which the strap ends are connected is rotatably supported in the side walls, so that the excess length of the strap can be wound about the member, to initially effect snug engagement of the hooks with the inner edges of the bumper. At least one of the members to which the strap ends are connected is also moveable towards the other member by screws which are rotatable to threadedly force the strap connector members one towards the other, thereby pulling upon the intermediate section of the strap, to tightly force the hooks into engagement with the edges of the bumper and force the clamp body against the outside of the bumper. The structure is such that the strap is disposed between the clamp body and the bumper, to prevent marring of the bumper surface by the clamp.

The clamp body had a load supporting cross member, adapted for interconnection with a complemental connector member which is adapted for connection to the towed vehicle or load, and this connector member is constructed in such a manner that it can be installed in either of two positions 180° displaced from one another, so that the height of the load support is altered between upper and lower positions. This is accomplished by providing an angular support arm between the load support member of the clamp and the connection with the load.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings.

Figure 1:
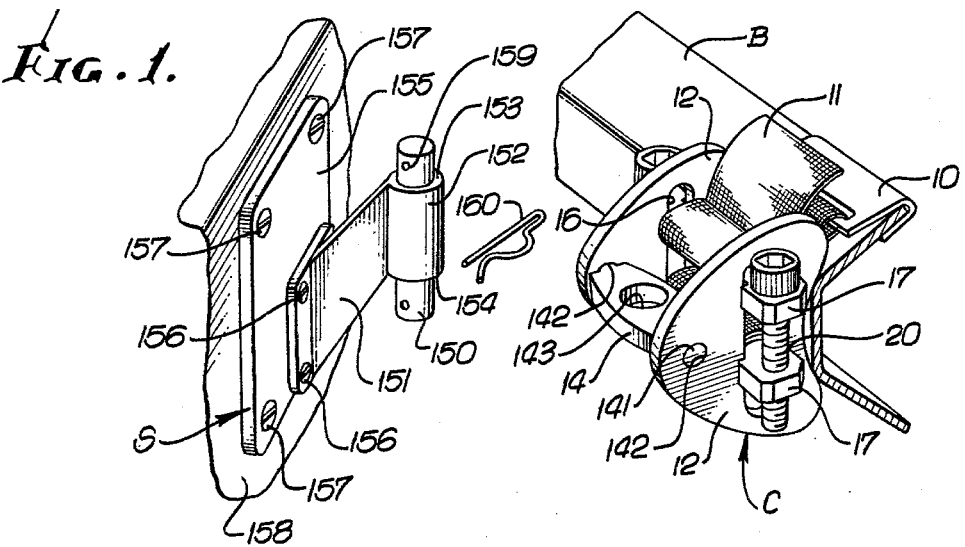
FIG. 1 is a view in perspective showing the bumper hitch of the invention.

As seen in the drawing: a bumper hitch is applied to the bumper B, such as the rear bumper, of the motor vehicle, and includes a clamp section C and a companion connector or support section S, adapted to be brought together and interconnected to support or tow a load by a universal connection. The clamp section C is secured to the bumper B by a pair of hooks or clips 10 adapted for engagement over the inner edge of the upper and lower flanges of the bumper, the hooks being connected to the clamp by a web or strap 11 of the usual and well known type utilized in hoisting and tying down materials during transport, which is readily available and which is durable, being abrasion resistant and of substantial tensile strength, on the order of a number of thousands of pounds in a single strand.

The clamping structure C includes a pair of opposed sidewalls 12 between which extend a plurality of cross members, including a pair of strap tensioning cross members 13, a cross member 14 adapted for connection with a towed or supported load, and forward cross members 15 through which an intermediate section of the strap 11 is extended for connection with the hooks or clips 10, with the ends of the strap engaged with the cross members 13, in a manner to be hereinafter described, whereby the strap can be initially tightened to position the clamp structure on the bumper, and thereafter forcefully tensioned.

Figure 2:
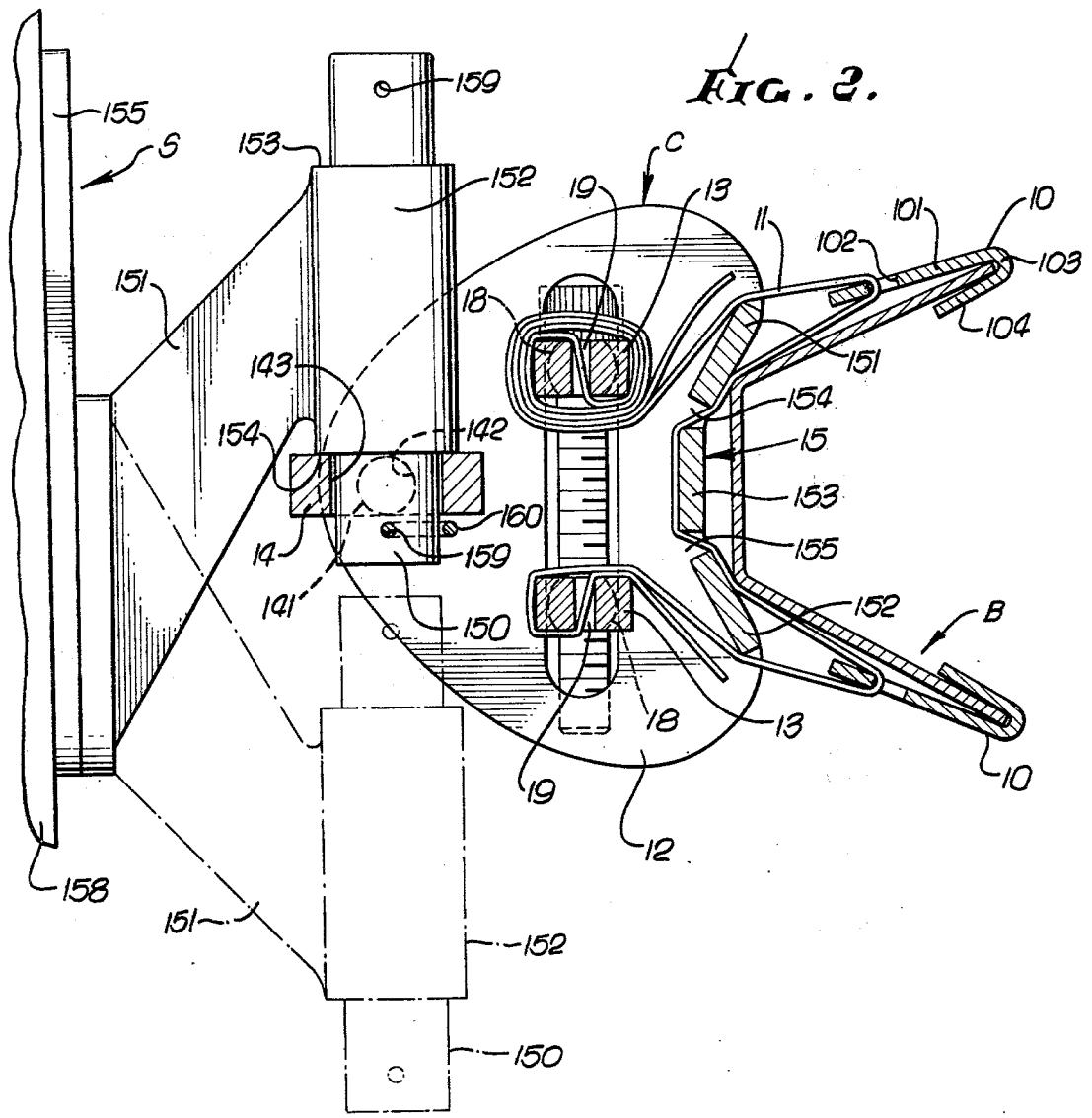
FIG. 2 is a vertical section through the assembled bumper hitch, with the connector shown in elevation.

In the form illustrated, each of the side walls 12 has a vertically elongated slot 16, through which the strap tensioning cross members 13 extend at opposite ends. Each cross member 13 has, at its opposite ends, enlarged heads 17 located exteriorly of the side wall 12 and a circular shank section 18, which is disposed in the slot 16, enabling the cross member 13 to be rotated, while the enlarged sections 17 retain the cross members in place. Within the side walls 12 the body of the strap tensioning cross members 13 is provided with an elongated slot 19 adapted to have an end of the strap threaded therethrough, whereby rotation of the cross members 13 through one half or more turns will wind a portion of the strap upon the cross member 13 over the end extremity of the strap which is frictionally engaged between the intermediate section of the strap and the cross members, and in response to tension firmly locked thereto. As seen in FIG. 2, the lower cross member 13 has been rotated sufficiently to cause the end extremity of the strap to be frictionally engaged beneath a single strand of the intermediate section of the strap and the cross member 13 in such a manner that the greater the tension applied to the intermediate section of the strap, the greater will be the frictional locking effect of the strap on the cross member. The upper cross member 13 has been turned a number of revolutions to eliminate initial slack from the strap.

The enlarged heads 17 of the cross members 13, externally of the side walls 12, are structured to accommodate tightening bolts or cap screws 20 which are rotatable in the upper cross member and threadedly engaged in the lower cross member, at the opposite ends thereof, whereby the belts can be rotated by an appropriate socket wrench or the like, and the cross members will be forceably moved one towards the other to tension the strap 11, as will be later described.

The cross members 15 provide a rigid interconnection between the two side walls 12 and are suitably interconnected therewith, as by welding. These cross members include an upper cross member 151, a lower cross member 152, and an intermediate cross member 153. The cross members 151 and 152 provide outwardly facing divergent surfaces adapted to oppose the outer upper and lower corners of the vehicle bumper, or bumpers of a range of sizes and forms, while the intermediate cross member 153, when the strap 11 is installed as illustrated, provides the primary anchor point for the clamp body structure. As shown, the intermediate section of the strap or webbing 11 extends through an upper transverse slot 154 between the upper and intermediate cross members 151 and 153, as well as through a lower transverse slot 155 extending horizontally between the intermediate cross member 153 and the lower cross member 152, whereby the strap or web extends along the inner side of the intermediate cross member 153 to apply a holding force to the clamp body. The strap extends from the slots 154 and 155 between the upper and lower cross members 151 and 152 and the confronting bumper surface, thereby providing protection against scarring or marring of the bumper or any finish thereon. Also, as shown, the sections of the strap 11 between the hooks 10 and the strap anchoring cross member 13 extends over the upper inner edge of the upper cross member 151 and below the lower inner edge of the lower cross member 152, thereby centralizing the clamp body on the bumper structure. It is, of course, possible that the sections of the strap which extend above and below the upper and lower cross members could be extended through the upper and lower slots 154 and 155.

The hooks or clips 10 are preferably, as shown, constructed of thin metal material which facilitates application of the hooks to the upper and lower inner edges of the bumper. Each hook has a flat body section 101 provided with a transverse slot 102 through which the web or strap slideably extends. At the outer end of the hook body it is recurved or bent back upon itself to provide a bight 103 engageable with the edge of the bumper and elongated retainer section 104 which prevents inadvertent dislodgement of the hooks from the edges of the bumper.

The connector cross member 14, previously referred to, is mounted between the side walls 12 of the clamp body structure. In the specific form illustrated, the cross member 14 is in the form of a plate having cylindrical end sections 141 disposed in circular holes 142 formed in the side plates 12. These pivot supports enable the support plate 14 to rock on a horizontal axis. However in other connector structures, as will be apparent from the following description, the cross plate 14 may be rigidly interconnected between the side plates 12, as by welding the cross member in place. In the form illustrated, the connector plate 14 has a central circular opening 143 adapted to receive a pin 150 of the connector section S, as will be later described, whereby the connector section S can pivot on a vertical axis relative to the horizontally pivoted connector plate 14, thereby providing, essentially, a typical universal connection. In the case of trailer hitches, the typical universal connection is provided by a ball and socket joint, and it is within the purview of the invention that, for example, the connector plate 14 can be provided with a ball mounted in the opening 143 to be engaged by the socket provided, as customary, on the tongue of a trailer.

The connector section S, of the embodiment of the invention herein illustrated, includes the previously described pin 150 which is carried by an arm 151 having at its outer extremity a sleeve 152, which receives the pin 150 in a manner whereby the pin projects at its opposite ends below and above the upper and lower shouldering surfaces 153 and 154 of the sleeve, which as seen in FIG. 2, rest upon the surface of the connector plate 14, when the hitch is assembled. The arm 151 is disposed at an angle or incline relative to a horizontal plane, and is appropriately mounted upon a face plate 155 as by suitable fastenings 156, the face plate 155, in turn, being connectable as by fasteners 157 to a suitable structure 158 which constitutes a portion of the device to be supported or towed by the hitch. The upper and lower ends of connector pin 150 are provided with drilled holes 159 adapted to receive a cotter pin or resilient pin 160, whereby, upon assembly with the clamp, the connector structure is locked in place.

As shown in broken lines in FIG. 2, the connector structure S is adapted to be inverted from the full line position, whereby the angle of the arm 151 and the double pin 150 will enable the supported or towed structure to be more or less elevated with relation to the height of the bumper to which the clamp is applied.

To apply the clamping structure to a bumper, a suitable length of the intermediate section of the strap is pulled from the cross members 13, to allow the hooks 10 to be applied to the edges of the bumper. During this operation, the bolts or cap screws 20 are removed. One or both of the cross members 13 can be manually rotated to take up the slack from the strap, and thereafter the bolts or cap screws can be inserted through the upper cross member 13 and threadedly engaged in the lower cross member, and then the bolts can be turned by an appropriate tool or socket wrench. Tightening of the bolts 20 moves the cross members 13 one towards the other so as to tension the strap 11 and draw the body structure of the clamp tightly into engagement with the bumper, but with the straps forming a protective layer between the metal portions of the clamp and the bumper. Establishing a connection between the clamp C and the connector S, as previously indicated, simply involves inserting an end of the pin 150 into the opening 143 of the connector plate 14, and thereafter locking the assembly together by installing the cotter pin or key 160 in the appropriate hole 159.

From the foregoing, it will now be apparent that the present invention provides a simple but efficient bumper hitch which can be easily applied to the usual automotive vehicle bumper without requiring special skill or tools, but the clamping structure is nevertheless securely retained in place on the bumper without damaging the same. The universal connection device provided by the connector plate and the pin of the connector support structure, as previously indicated can be modified to employ any suitable universal connection or nonuniversal connection, if desired, but the structure specifically illustrated is ideally suited for use in the mounting of the camping equipment on the rear bumper of the vehicle, as more particularly disclosed and claimed in my above-identified companion application.

While in the preferred structure illustrated, both of the strap engaging cross members 13 are vertically moveable in the slots 16 of the sidewalls 12 of the body structure, a suitable clamp can also be constructed in which one of the cross members is fixed between the side walls, and the other cross member 13 is rotatable and vertically moveable. The point here is that the cross members are moveable one towards the other and at least one of them is rotatable.

I claim:

1. A clamp for a bumper hitch construction comprising: a body having opposed side walls in laterally spaced relation, a pair of vertically spaced cross members extending between said side walls, one of said cross members being vertically shiftably and rotatably supported by said side walls, a flat, flexible strap having ends secured to said cross members, hooks connected between the ends of said strap engageable with inner edges of a bumper, means for forcefully urging said cross members one towards the other to pull on said strap and tightly engage said hooks with the edges of the bumper, and connector means on said body enabling connection with a companion hitch structure.

2. A clamp for a bumper hitch as defined in claim 1, wherein said connector means on said body is constructed to enable universal movement between said clamp and said companion hitch structure.

3. A clamp for a bumper hitch construction as defined in claim 1; wherein said connector means on said body comprises a connector plate having a vertical opening therein, and including a companion hitch structure having a pin rotatably insertable into said opening.

4. A clamp for a bumper hitch construction as defined in claim 1; wherein said connector means on said body comprises a connector plate extending between said side walls and having an opening therein to receive a connector member.

5. A clamp for a bumper hitch construction as defined in claim 1; including an anchor cross member between said side walls, said strap extending from said hooks between said side walls and about said anchor cross member.

6. A clamp for a bumper hitch construction as defined in claim 1; including an anchor cross member between said side walls, said strap extending from said hooks between said side walls and about said anchor cross member, additional cross members between said side walls spaced above and below said anchor cross member, said strap extending from the said first-mentioned cross members above and below said additional cross members into engagement with said hooks and between said additional cross members and said anchor cross member into engagement with the latter.

7. A clamp for a bumper hitch construction as defined in claim 1; including an anchor cross member between said side walls, said strap extending from said hooks between said side walls and about said anchor cross member, said first mentioned cross members having longitudinal slots receiving end portions of said strap with at least one-half a wrap of said strap extending about and frictionally holding said end portions in engagement with said first-mentioned cross members.

8. A clamp for a bumper hitch construction as defined in claim 1; said one of said cross members having a longitudinal slot, an end of said strap extending through said slot enabling winding of said strap and frictional locking of said end on said one of said cross members.

9. A clamp for a bumper hitch construction as defined in claim 1; said one of said cross members having a longitudinal slot, an end of said strap extending through said slot enabling winding of said strap and frictional locking of said end on said one of said cross members; and including an anchor cross member between said side walls, said strap extending from said hooks between said side walls and about said anchor cross member.

10. A clamp for a bumper hitch construction as defined in claim 1; said one of said cross members having a longitudinal slot, an end of said strap extending through said slot enabling winding of said strap and frictional locking of said end on said one of said cross members, and including an anchor cross member between said side walls, said strap extending from said hooks between said side walls and about said anchor cross member, additional cross members between said side walls spaced above and below said anchor cross member, said strap extending from the said first-mentioned cross members above and below said additional cross members into engagement with said hooks and between said additional cross members and said anchor cross member into engagement with the latter.

11. A bumper hitch comprising: a body having opposed side walls in laterally spaced relation, a pair of vertically spaced cross members extending between said side walls, one of said cross members being vertically shiftably and rotatably supported by said side walls, a flat, flexible strap having ends secured to said cross members, hooks connected between the ends of said strap engageable with inner edges of a bumper, means for forcefully urging said cross members one towards the other to pull on said strap, a companion connector member, and means providing a universal connection between said connector member and said body.

12. A bumper hitch as defined in claim 11; means enabling connection of said connector member to said body at different elevations.

13. A bumper hitch as defined in claim 11; said means enabling connection of said connector member to said body including a support arm for said connector member disposed on an incline, and mounting means for said arm enabling inversion of said arm.

14. A bumper hitch as defined in claim 11; including an anchor cross member between said side walls, said strap extending from said hooks between said side walls and about said anchor cross member.

15. A bumper hitch as defined in claim 11; including an anchor cross member between said side walls, said strap extending from said hooks between said side walls and about said anchor cross member, additional cross members between said side walls spaced above and below said anchor cross member, said strap extending from the said first-mentioned cross members above and below said additional cross members into engagement with said hooks and between said additional cross members and said anchor cross member into engagement with the latter.

16. A bumper hitch as defined in claim 11; including an anchor cross member between said side walls, said strap extending from said hooks between said side walls and about said anchor cross member, said first mentioned cross members having longitudinal slots receiving end portions of said strap with at least one-half a wrap of said strap extending about and frictionally holding said end portions in engagement with said first-mentioned cross members.

17. A bumper hitch as defined in claim 11; said one of said cross members having a longitudinal slot, an end of said strap extending through said slot enabling winding of said strap and frictional locking of said end on said one of said cross members.

18. A bumper hitch as defined in claim 11; said first mentioned cross members having longitudinal slots receiving end portions of said strap with at least one-half a wrap of said strap extending about and frictionally holding said end portions in engagement with said first-mentioned cross members.

19. A bumper hitch as defined in claim 11; said first mentioned cross members having longitudinal slots receiving end portions of said strap with at least one-half a wrap of said strap extending about and frictionally holding said end portions in engagement with said first-mentioned cross members, an anchor cross member between said side walls, additional cross members between said side walls spaced above and below said anchor cross member, said strap extending from the first-mentioned cross members above and below said additional cross members into engagement with said hooks and between said additional cross members and said anchor cross member into engagement with the latter.

20. A bumper hitch as defined in claim 11; said first mentioned cross members having longitudinal slots receiving end portions of said strap with at least one-half a wrap of said strap extending about and frictionally holding said end portions in engagement with said first-mentoned cross members, an anchor cross member between said side walls, additional cross members between said side walls spaced above and below said anchor cross member, said strap extending from the said first-mentioned cross members above and below said additional cross members into engagement with said hooks and between said additional cross members and said anchor cross member into engagement with the latter, means enabling connection of said connector member to said body at different elevations.

* * * * *